United States Patent [19]

Zuccaro

[11] Patent Number: 4,576,348

[45] Date of Patent: Mar. 18, 1986

[54] METHOD AND APPARATUS FOR ESTABLISHING A REFERENCE POTENTIAL ON SATELLITES IN PLANETARY IONOSPHERES

[75] Inventor: Don R. Zuccaro, Garland, Tex.

[73] Assignee: Board of Regents, University of Texas System, Austin, Tex.

[21] Appl. No.: 508,470

[22] Filed: Jun. 28, 1983

[51] Int. Cl.$^4$ .................. B64G 1/54; B64G 1/44; H01G 1/08

[52] U.S. Cl. .................. 244/173; 244/158 R; 244/1 A; 361/218

[58] Field of Search .................. 244/173, 176, 158 R, 244/1 A; 361/218; 324/72, 457; 307/359

[56] References Cited

U.S. PATENT DOCUMENTS

| | | | |
|---|---|---|---|
| 3,604,957 | 9/1971 | Satula | 307/359 |
| 3,634,751 | 1/1972 | Miller | 323/9 |
| 3,984,730 | 10/1976 | Hunter | 324/72 |
| 4,110,677 | 8/1978 | Boronkay et al. | 323/19 |
| 4,328,434 | 5/1982 | Geller | 307/359 |
| 4,433,297 | 2/1984 | Buchheit | 324/457 |

OTHER PUBLICATIONS

Samir, "The Equilibrium Potential of a Spacecraft in the Ionosphere," *Planet Space Sci.*, vol. 14 1966, pp. 1131-1137.

Whipple, "Effect of Satellite Potential on Direct Ion Density Measurements Through the Plasma Pause," *Journal of Geophysical Research*, vol. 79, No. 1, 1974.

Hanson, "Techniques for Measuring Bulk Gas-Motions from Satellites," *Space Science Instrumentation* 1, 1975, pp. 493-524.

Brace, "The Near-Wake Structure of the Atmosphere Explorer C(AE-C) Satellite: A Parametric Investigation," *Journal of Geophysical Research*, vol. 84, No. A2, Feb. 1, 1979, pp. 513-525.

Hoffman, "Dynamics Explorer Spacecraft and Ground Operation Systems," *Space Science Instrumentation* 5, 1981, pp. 349-367.

Krehbiel, "The Dynamics Explorer Langmuir Probe Instrument," *Space Science Instrumentation* 5, 1981, pp. 493-502.

Primary Examiner—Trygve M. Blix
Assistant Examiner—Rodney Corl
Attorney, Agent, or Firm—Arnold, White & Durkee

[57] ABSTRACT

A simple, nearly passive apparatus is disclosed that allows a spacecraft sensor to be driven to a potential close to that of a plasma where the ion concentration exceeds about 100 cm$^{-3}$ even in the presence of a large vehicle potential. The apparatus includes a conductive reference surface insulated from all spacecraft elements. The reference surface is situated on the spacecraft such that it faces in the direction of motion, and collects ions thereon. There is developed on the surface a plasma potential. The reference surface is connected to the inverting input of an operational amplifier that is powered by floating voltages referenced to the potential at the noninverting input of the amplifier. Since the operational amplifier has to maintain equal voltages at both inputs, the amplifier will drive against spacecraft ground until the voltage at the noninverting input is substantially equal to the voltage at the inverting input. The reference potential established at the noninverting input is therefore the same as the potential on the reference surface.

5 Claims, 4 Drawing Figures

METHOD AND APPARATUS FOR ESTABLISHING A REFERENCE POTENTIAL ON SATELLITES IN PLANETARY IONOSPHERES

The present invention was made with Government support and the Government has rights in this invention pursuant to National Aeronautics and Space Administration Contract No. NGL44-004-130 and Air Force Contract No. F19628-79-C-0108.

BACKGROUND OF THE INVENTION

The present invention relates to satellite-borne instrumentation for low-energy charged particle measurements; and more particularly, it relates to the maintenance of a stable sensor potential near the ionospheric plasma potential.

A problem that confronts instrumenters attempting to make in situ low-energy charged particle measurements with satellite-borne instruments is that of maintaining a stable sensor potential near the ionospheric plasma potential. The problem is primarily due to electron currents collected by positive potentials exposed to the plasma on the satellite solar arrays. Past experience has shown that spacecraft whose solar panels are operated with their positive terminals grounded, thus exposing a negative solar array potential, are characterized by having a steady and slightly negative vehicle potential that is ideal for making these measurements. The NASA Atmosphere Explorer and Dynamics Explorer spacecraft utilized positive ground systems and demonstrated these characteristics. Conversely, spacecraft with negative grounds tend to have rather large and erratic negative potentials. The NASA OGO 6 satellite, for example, had a variable vehicle potential some 20 V negative when the solar array was in the sunlight.

Factors such as cost, the use of off-the-shelf hardware, and reliance on past successful designs have resulted in the incorporation of the negative ground systems in most satellites flown by both NASA and the Department of Defense, and efforts to conceal the positive solar array potentials from the plasma have mostly been either nonexistent or costly and unreliable. Since the space shuttle uses a +28 V system (negative ground), the advent of the shuttle-launched satellite era may well result in the exclusive use of negative ground systems in future satellite designs to assure compatibility with the shuttle while the satellite is in the bay.

Low-energy particle detectors can in fact be designed to operate on satellites with large negative vehicle potentials by electrically isolating the sensor system and biasing it to some potential. Electrical isolation of the sensor system is relatively straightforward in that mechanical elements can be isolated with conventional insulators and the electronics can be isolated by using floating power suppies with transformer isolation and optical couplers or level shifter circuits for data and timing signal interface with the spacecraft. Heretofore, however, no straightforward method for maintaining a bias potential near the plasma potential has been demonstrated.

SUMMARY OF THE INVENTION

The reference potential circuit apparatus of the present invention provides a reference potential that depends weakly on the electron temperature and that is slightly below the plasma potential. This reference potential is well suited to many charged particle instruments for direct use as a sensor potential, and it can also be used as a basis to establish other biases with respect to the plasma potential. The apparatus is nearly passive in that it does not require voltage ramps or exposed positive potentials usually associated with instrumentation used to derive the plasma potential. The apparatus is suitable for use on spacecraft operating in planetary ionospheres where there is a dense, low-energy plasma with a Debye length less than about 10 cm (i.e., with $T_c > N_e$). Typically, $N_e$ will be greater than 100 $cm^{-3}$.

It is believed that the apparatus of the present invention will enhance the making of low-energy charged particle measurements from space vehicles moving through an ionosphere at speeds higher than the ion thermal speed. Sensor potentials referenced to the plasma potential rather than to the vehicle potential can be maintained by using this technique. This is a distinct advantage on spacecraft that expose positive potentials on the solar arrays, since these spacecraft tend to acquire relatively large and variable negative potentials that preclude reliable measurement of many ionospheric plasma parameters in the conventional manner, i.e., with the instrument sensor referenced to the vehicle potential. The incorporation of the reference potential circuit apparatus in low-energy charged particle detector designs should result in instruments capable of reliably coping with these adverse vehicle potentials.

In accordance with the present invention, apparatus for establishing a reference potential on satellites in planetary ionospheres includes a conductive reference surface for disposition on the spacecraft to face in the direction of motion. The conductive reference surface collects ions and adjusts to a plasma potential. Further included is an operational amplifier having inverting and noninverting inputs and an output. The inverting input of the amplifier is connected to the conductive reference surface. A power source providing floating positive and negative voltages referenced to the potential at the noninverting input of the amplifier is provided for powering the amplifier. The output of the amplifier is connected to drive against spacecraft ground until the voltage at the noninverting input is substantially equal to the voltage at the inverting input. Such operation establishes a reference potential at the noninverting input, which potential is the same as the potential on the reference surface.

In order to extend the voltage range of the reference potential circuit, the output of the amplifier can be connected to drive through a power supply against spacecraft ground. Alternatively, the output of the amplifier can be connected to drive through a programmable power supply against spacecraft ground. Yet a further alternative is to provide a second stage operational amplifier coupled to the output of the first amplifier and connected to drive against spacecraft ground.

BRIEF DESCRIPTION OF THE DRAWINGS

A written description setting forth the best mode presently known for carrying out the present invention, and the manner of implementing and using it, is provided by the following detailed description of an illustrative reference potential circuit embodiment shown in the attached drawings wherein.

DETAILED DESCRIPTION OF AN ILLUSTRATIVE EMBODIMENT

Figure 1:
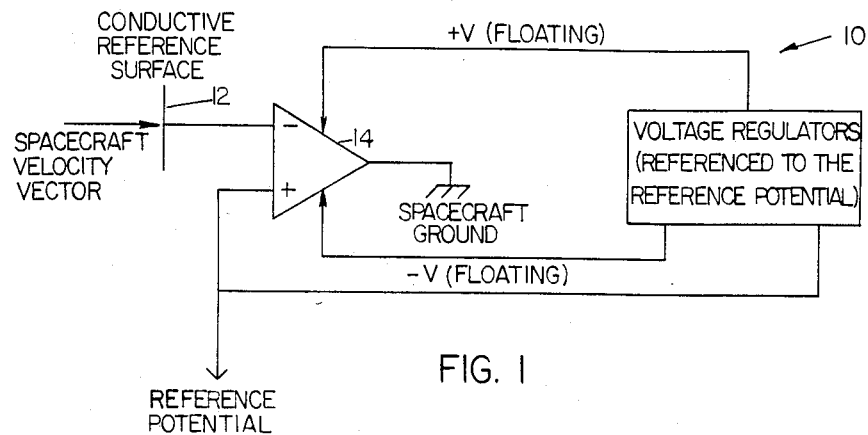
FIG. 1 is a functional diagram of the reference potential circuit of the present invention.

As illustrated in FIG. 1, the reference potential circuit 10 utilizes a conductive reference surface 12 insulated from all other spacecraft elements. The reference surface is situated on the spacecraft (usually moving supersonically) such that it is always facing in the direction of motion in order to use the spacecraft ram velocity for ion collection on the reference surface. If there is a sufficiently high insulation resistance, the reference surface will adjust itself to a potential that will reduce the net current to the surface to zero; i.e., a sufficiently negative potential will be acquired to repel enough thermal electrons so that equal ion and electron currents are collected. Neglecting effects of the reference surface potential on positive ion motion, the effect of the wake on electron collection, and the effects of photoemission and the ambient magnetic field, the potential is given by:

$$\phi_s = -\frac{KT_e}{e} \ln\left[\frac{8KT_e}{\pi m_e V_s^2}\right]^{\frac{1}{2}} \quad (1)$$

where K is Bolttzmann's constant, $T_e$ and $m_e$ are the electron temperature and mass, respectively, e is the electron charge, and $V_s$ is the spacecraft velocity. For typical values of $T_e=3000°$ K. and $V_s=7.5$ km s$^{-1}$, the reference surface potential will be of the order of 1 V negative with respect to the plasma potential.

The reference surface is connected to the inverting input of a field effect transistor (FET) input operational amplifier 14 that is powered by floating voltages referenced to the potential at the noninverting input of the amplifier. The high-input impedance and low-input bias current of the FET-input operational amplifier are necessary to avoid changing the potential on the reference surface by disturbing the equilibrium of the ion and electron currents. Since the operational amplifier has to maintain equal voltages at both inputs, the amplifier will drive against spacecraft ground until the voltage at the noninverting input is equal (at least to within the few millivolts input offset voltage of the amplifier) to the voltage at the inverting input. The reference potential established at the noninverting input is therefore the same as the potential on the reference surface.

Electrical isolation of the sensor system is accomplished by using conventional insulators to isolate the mechanical elements and isolating the electronics by using transformers, optical couplers, and level shifter circuits. Each of these elements introduces some finite resistance path to ground. Even if the sum of these resistances is as low as 10,000 ohms, the typical operational amplifier output current capability of 10 ma will support an IR drop of 100 V between the spacecraft ground and the sensor system. This voltage is much larger than can be anticipated.

Sensors can be biased positively with respect to the reference potential provided that the spacecraft presents a conductive area in the direction of motion large enough to insure that an ion current equal to the net electron current to the sensors can be collected by the spacecraft at a vehicle potential within the voltage range of the reference potential circuit.

The voltage range over which the reference potential circuit 10 must operate is dictated by the potential of the spacecraft with respect to the plasma potential. For satellites exposing a potential +V with respect to the spacecraft ground on the solar array, the maximum negative excursion of the vehicle potential will be approximately −V with respect to the plasma potential, so the circuit must be able to control the reference potential in the range 0 to +V volts with respect to the spacecraft ground.

The voltage range of the circuit in FIG. 1 is limited by the output voltage swing of the operational amplifier. FET-input operational amplifiers that satisfy the low-input bias current and high-input impedance requirements are typically rated for operation with a maximum supply voltage of ±15 V and have a typical output voltage swing of about ±13 V. There are several ways of extending the voltage range of the circuit, however.

Figure 2:
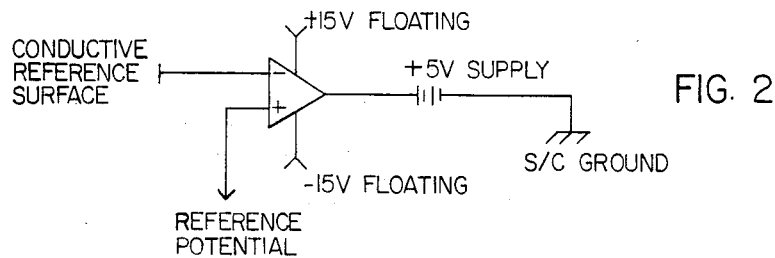
FIG. 2 is an embodiment of the reference potential circuit for use on a satellite that exposes a maximum solar array potential of about +13 V.

For instrumentation on a satellite that exposes a maximum solar array potential of about +13 V, +5 V supply is used between the operational amplifier output and spacecraft ground. This circuit embodiment is shown in FIG. 2. The amplifier 16 will drive against spacecraft ground through the +5 V supply to provide a reference potential control range of about −8 V to +18 V. This should provide an adequate safety margin for the anticipated vehicle potential range.

Figure 3:
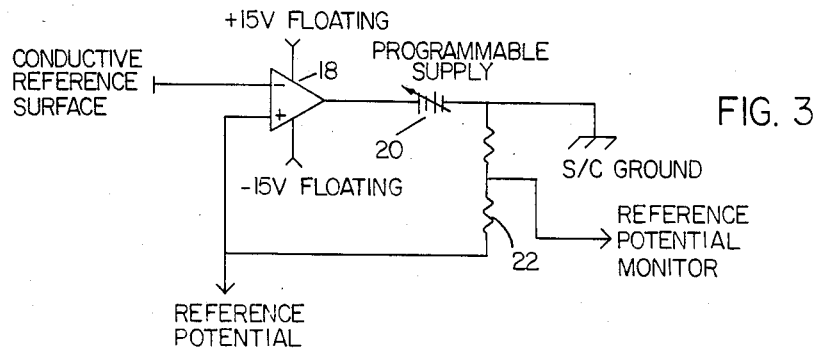
FIG. 3 is an embodiment of the reference potential circuit for use on a satellite that uses +28 V batteries and exposes a maximum unregulated positive potential of about +36 V on the solar arrays.

Spacecraft that use +28 V batteries typically expose a maximum unregulated positive potential of about +36 V on the solar arrays. One configuration of the reference potential circuit capable of operating over the voltage range required on these spacecraft is shown in FIG. 3. Here, the amplifier 18 drives against spacecraft ground through a supply that is programmable by ground command. The circuit will provide control of the reference potential within about ±13 V of the programmable supply voltage, and if the supply is programmable from 0 to +28 V in increments of a few volts, an overall voltage range of −13 to +41 V can be accommodated. The programmable supply 20 would be adjusted by ground command and would probably require only two voltage settings, one for operation with the solar array illuminated and one without illumination. A simple voltage divider 22 can be used to provide a reference potential monitor to the telemeter to aid in deciding the optimum programmed voltage.

Figure 4:
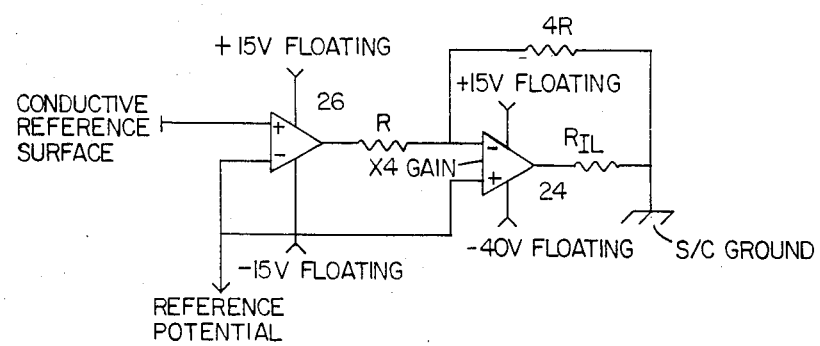
FIG. 4 is an embodiment using an additional stage of high-voltage amplification to extend the voltage range of the reference potential circuit.

Another configuration shown in FIG. 4 extends the voltage range of the circuit by using a second stage high-voltage operational amplifier 24 in addition to amplifier 26. The resistor $R_{IL}$ is used to protect the high-voltage amplifier by current limiting the output. Circuits utilizing discrete devices could also be used in place of the high-voltage operational amplifier.

The reference surface must present a cross-sectional area normal to the direction of motion of sufficient size to collect an ion current that will support an IR drop across the reference surface isolation resistance which is equal to the worst case vehicle potential. Assuming an isolation resistance of $10^{11}$ ohms and a vehicle potential of +36 V, the ion current required to the reference surface is $3.5 \times 10^{-10}$ A. When a conducting plate mounted on the forward-looking face of a spacecraft is moving through a plasma with a speed much greater than the ion thermal speed, then the ion current I to the plate is given by:

$$I = NVA_q \qquad (2)$$

where N is the total ion concentration, V is the velocity of the spacecraft, A is the cross-sectional area of the reference surface, and q is the unit charge for a singly charged ion. If a charged particle instrument is required to make measurements in a plasma with an ion concentration of 100 ions cm$^{-3}$ and above, for example, a reference surface cross-sectional area of about 38 cm$^2$ would yield the required minimum current of $3.6 \times 10^{-10}$ A at a spacecraft velocity of 6 km s$^{-1}$. One must take care, however, that the reference surface is sufficiently removed (a few Debye lengths) from the spacecraft so that it is not shielded from the ambient plasma. For very low plasma concentrations ($<<10^3$ cm$^{-3}$), the photocurrents ejected from the spacecraft by solar ultraviolet radiation can become comparable to, or exceed, the thermal electron currents. Under these conditions the circuits described herein become inoperable.

A resistor (several megaohms) added in series between the reference surface and the operational amplifier can be used to protect the amplifier input from static discharge damage. If the resistor is added near the reference surface and a shielded cable is used to connect the resistor to the amplifier, the resistance-capacitance (RC) network formed by the resistor and the inherent cable capacitance will provide RF bypassing. Additional RF bypassing can be added, provided that that bypass capacitors used do not introduce excessive leakage paths between the reference surface and other elements of the spacecraft.

The foregoing description of the invention has been directed to a particular preferred embodiment for purposes of explanation and illustration. It will be apparent to those skilled in this art that many modifications and changes in both the illustrated apparatus and the method taught may be made without departing from the invention. It is the applicant's intention in the following claims to cover all equivalent modifications and variations as fall within the scope of the invention.

What is claimed is:

1. Apparatus for use on spacecraft having a ground reference and having a solar array, to establish a reference potential near the ionospheric plasma potential, comprising:

a conductive reference surface for disposition on the spacecraft to face in the direction of motion, for collecting ions and adjusting to a plasma potential;

an operational amplifier having inverting and noninverting inputs and an output, with the inverting input being connected to the conductive reference surface; and a power source for powering the amplifier, said power source providing floating positive and negative voltages referenced to the potential at the noninverting input of the amplifier;

the output of said amplifier being connected to drive against spacecraft ground until the voltage at the noninverting input is substantially equal to the voltage at the inverting input, whereby the reference potential established at the noninverting input is the same as the potential on the reference surface.

2. Apparatus of claim 1 wherein:
the output of said amplifier is connected to drive through a power supply against spacecraft ground.

3. Apparatus of claim 1 wherein:
the output of said amplifier is connected to drive through a programmable power supply against spacecraft ground.

4. Apparatus of claim 1 further comprising:
a second stage operational amplifier coupled to the output of the first amplifier and connected to drive against spacecraft ground.

5. A method of establishing a reference potential near the ionospheric plasma potential used for biasing instrument sensors carried on a spacecraft having a solar array and a ground reference, comprising the steps of:

providing a conductive reference surface on the spacecraft facing in the direction of motion, for collecting ions and developing a plasma potential;

applying the plasma potential to the inverting input of an operational amplifier powered by floating positive and negative voltages referenced to the potential at the noninverting input; and driving against spacecraft ground from the amplifier output until the voltage at the noninverting input is substantially equal to the voltage at the inverting input, whereby the reference potential established at the noninverting input is the same as the potential on the reference surface.

* * * * *